(12) United States Patent
Suzuki et al.

(10) Patent No.: US 8,051,056 B2
(45) Date of Patent: Nov. 1, 2011

(54) ACQUIRING ONTOLOGICAL KNOWLEDGE FROM QUERY LOGS

(75) Inventors: Hisami Suzuki, Redmond, WA (US); Satoshi Sekine, Scarsdale, NY (US)

(73) Assignee: Microsoft Corporation, Redmond, WA (US)

( * ) Notice: Subject to any disclaimer, the term of this patent is extended or adjusted under 35 U.S.C. 154(b) by 449 days.

(21) Appl. No.: 11/807,410

(22) Filed: May 29, 2007

(65) Prior Publication Data

US 2008/0301121 A1    Dec. 4, 2008

(51) Int. Cl.
*G06F 17/30* (2006.01)

(52) U.S. Cl. .................... 707/705; 707/765; 707/766

(58) Field of Classification Search .................. None
See application file for complete search history.

(56) References Cited

U.S. PATENT DOCUMENTS

| | | | |
|---|---|---|---|
| 6,212,494 B1 | 4/2001 | Boguraev | 704/9 |
| 6,502,091 B1 | 12/2002 | Chundi et al. | 707/3 |
| 6,556,983 B1 * | 4/2003 | Altschuler et al. | 706/55 |
| 6,862,710 B1 * | 3/2005 | Marchisio | 715/206 |
| 6,941,293 B1 | 9/2005 | Dean et al. | 707/3 |
| 6,941,294 B2 | 9/2005 | Flank | 707/3 |
| 7,398,261 B2 * | 7/2008 | Spivack et al. | 706/55 |
| 7,490,092 B2 * | 2/2009 | Sibley et al. | 707/100 |
| 7,555,563 B2 * | 6/2009 | Ott et al. | 709/240 |
| 7,685,084 B2 * | 3/2010 | Sisk et al. | 706/45 |
| 2005/0080795 A1 * | 4/2005 | Kapur et al. | 707/100 |
| 2006/0004850 A1 | 1/2006 | Chowdhury | 707/103 |
| 2006/0122979 A1 | 6/2006 | Kapur et al. | 707/3 |
| 2006/0253423 A1 * | 11/2006 | McLane et al. | 707/2 |
| 2007/0143176 A1 * | 6/2007 | Nong et al. | 705/14 |
| 2007/0260580 A1 * | 11/2007 | Omoigui | 707/2 |
| 2007/0260589 A1 * | 11/2007 | Yugami | 707/3 |
| 2008/0077570 A1 * | 3/2008 | Tang et al. | 707/5 |
| 2008/0120072 A1 * | 5/2008 | Bartz et al. | 703/2 |

OTHER PUBLICATIONS

Sekine & Suzuki, S. & H.; "Acquiring Ontological Knowledge from Query Logs," WWW 2007 / Poster Paper, Topic: Semantic Web, May 8-12, 2007, pp. 1223-1224.
Sekine, Satoshi.; "Automatic Paraphrase Discovery based on Context and Keywords between NE Pairs," NYU, date unknown, 8 pgs.
Brill et al.; "Automatically Harvesting Katakana-English Term Pairs from Search Engine Query Logs," Microsoft Research, Redmond, WA , date unknown, 7 pgs.
Mori et al.; "Keyword Extraction from the Web for Personal Metadata Annotation," Univ. of Tokyo, Japan, NLPRS 2001, pp. 51-60.

* cited by examiner

*Primary Examiner* — Shyue Jiunn Hwa
(74) *Attorney, Agent, or Firm* — Westman, Champlin & Kelly, P.A.

(57) ABSTRACT

Methods are disclosed for acquiring ontological knowledge using query logs. In one embodiment, query logs are first utilized as a basis for identifying important contexts associated with terms belonging to a semantic category. Then, those contexts are as a basis for identifying new terms belonging to the same category or, in another embodiment, as a basis for removing extraneous or obsolete terms identified as being in the same category.

16 Claims, 4 Drawing Sheets

ACQUIRING ONTOLOGICAL KNOWLEDGE FROM QUERY LOGS

BACKGROUND

At least for applications within the fields of computer science and information science, it is sometimes useful to utilize a listing of words and/or phrases that are grouped based on category. For example, a listing might be indicative of the fact that "Academy Award," "Turing award," and "Nobel prize" are all kinds of awards. Information in such a listing can be utilized for a wide variety of different purposes such as, but certainly not limited to, serving as a basis for improving Internet search processes and/or displaying search results more appropriately. Unfortunately, keeping a listing updated through consistent expansion to include new accurately grouped words and/or phrases is not typically a straightforward or efficient undertaking.

One option is to derive words and/or phrases from a large collection of regular text such as magazine articles, newspaper articles or any text available on the web. In such a case, it is possible to do some level of categorization based on characteristics of contextual words that occur on either or both sides of a candidate word or words. Unfortunately, however, within regular text, contextual words are somewhat likely to be limited in terms of their ability to serve as an effective basis for categorization. Determining which contextual words are appropriate to support categorization is a complicated undertaking.

The discussion above is merely provided for general background information and is not intended for use as an aid in determining the scope of the claimed subject matter.

SUMMARY

Methods for acquiring ontological knowledge using query logs are provided. In one embodiment, query logs are first utilized as a basis for identifying important contexts associated with terms belonging to a semantic category. Then, those contexts are utilized as a basis for identifying new terms belonging to the same category or, in another embodiment, as a basis for removing extraneous or obsolete terms identified as being in the same category.

This Summary is provided to introduce a selection of concepts in a simplified form, which are further described below in the Detailed Description. This Summary is not intended to identify key features or essential features of the claimed subject matter, nor is it intended for use as an aid in determining the scope of the claimed subject matter. The claimed subject matter is not limited to implementations that solve any or all disadvantages noted in the background.

DETAILED DESCRIPTION

Figure 1:
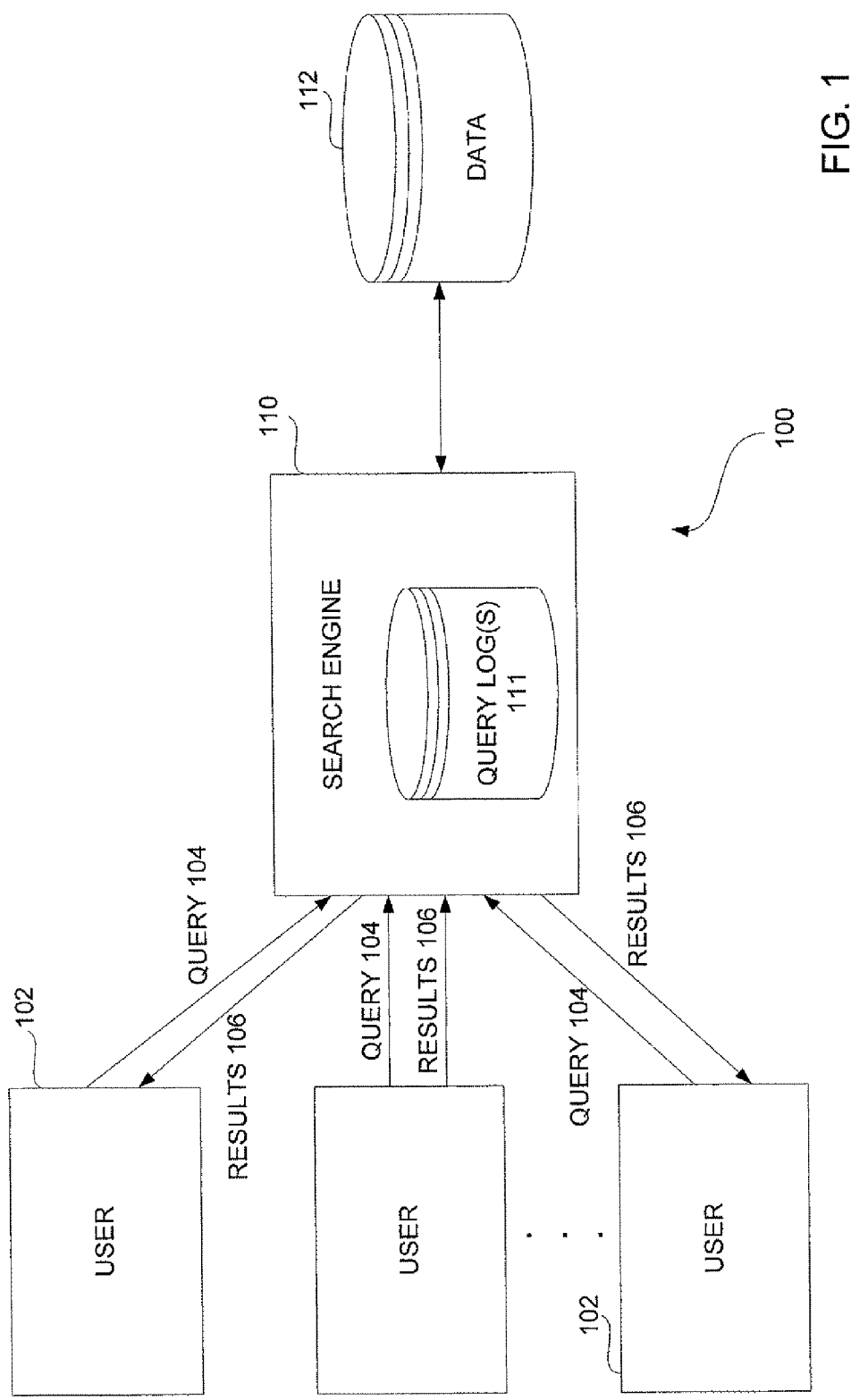
FIG. 1 is a schematic diagram of a querying environment.

Those skilled in the art will appreciate that query logs are generated in a wide variety of different contexts and environments. As one example, FIG. 1 is a schematic diagram of a querying environment 100. Environment 100 includes a plurality of users 102 of which a representative three are shown in the Figure. Users 102 submit queries 104 to a search engine 110. Search engine 110 processes the queries and identifies corresponding components of a collection of data 112. The corresponding data components themselves and/or a representation thereof are returned to appropriate users in the form of result sets 106. One or more query logs 111 are illustratively maintained as a record of queries that are submitted and processed within environment 100. Depending on the details of a given implementation, a query log III might be configured to track queries of all queries 104 from all users, only queries 104 from certain predefined users, or only queries from a single predefined user.

Those skilled in the art will appreciate that environment 100 can be implemented in many different contexts. For example, but certainly not by limitation, search engine 110 is a server-based Internet search engine configured to enable users 102 to initiate, from client computing devices, Internet search requests (i.e., a remotely originated query of remotely stored content). In another example, a user uses search engine 110 to search for contents on the same computing device upon the query 104 originates (e.g., a locally initiated search of locally stored content). These are just several of many specific contexts within the scope of the present invention. It is to be understood that the scope of the present invention is not limited to environment 100 or any specific implementation thereof.

When people inquire about something (e.g., an object or an event), they typically want to know about its specific properties. For example, when people inquire about an award, they are usually interested in the nominees or winners. As it happens, search queries, such as those tracked in a query log 111, often prove to be a rich and focused source of properties related to a given search target or destination. As it happens, the qualities of this type of data prove to be conducive to utilizing a query log as a basis for automatically identifying and categorizing words.

Figure 2:
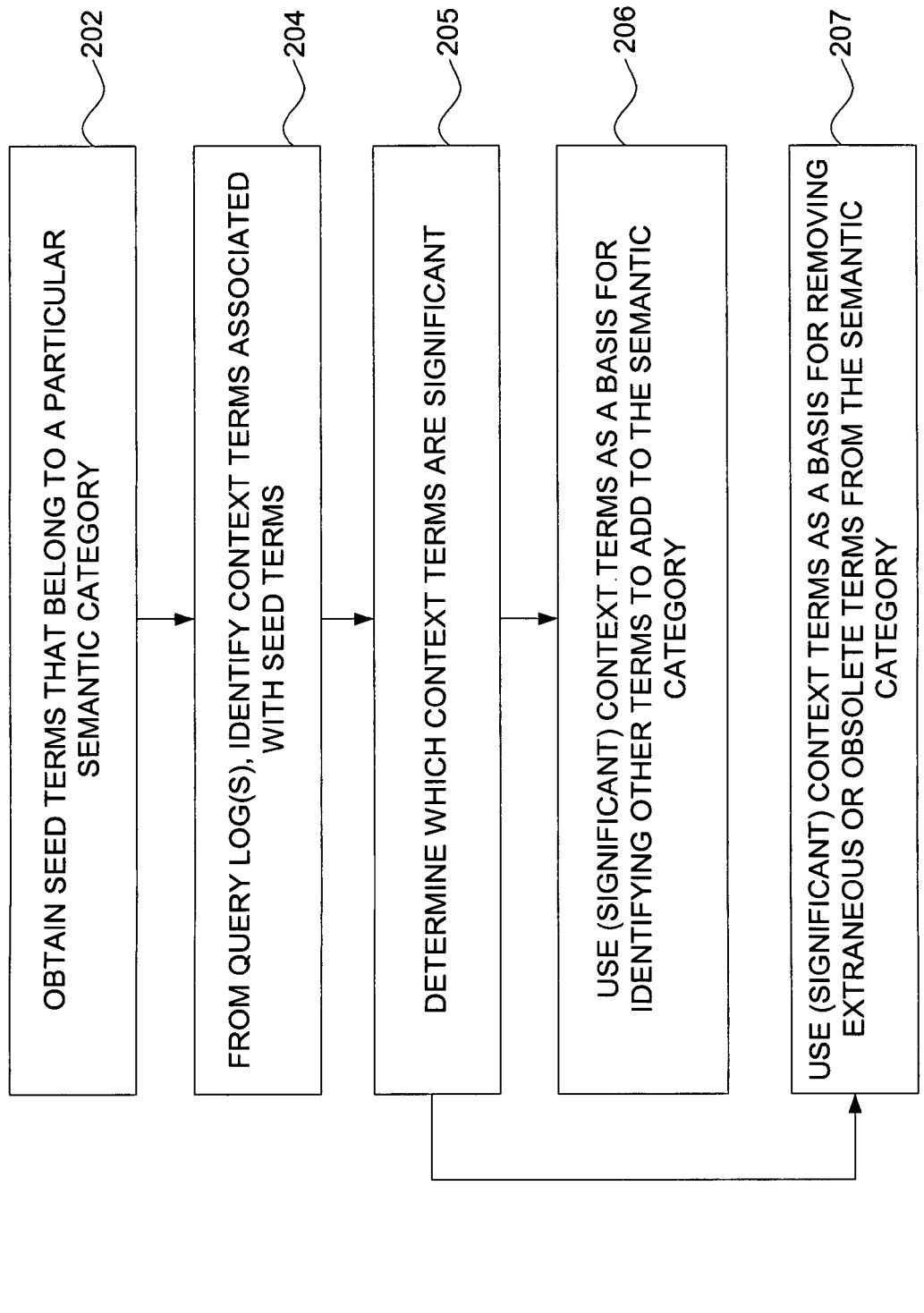
FIG. 2 is a flow chart diagram demonstrating steps associated with a process for using one or more search query logs as a basis for building up ontological knowledge about the properties of semantic categories.

FIG. 2 is a flow chart diagram demonstrating steps associated with a process 200 for using one or more search query logs 111 as a basis for building up ontological knowledge about the properties of semantic categories. It should be noted that the present invention is not limited to utilizing query log information produced based on the activity of a single search processor. It is within the scope of the present invention to combine multiple collections of query log information, for example, produced based on the activity of multiple search processors.

In accordance with step 202, process 200 begins with an initial list (herein referred to as a "seed list") of terms belonging to a particular semantic category. For example, the terms "Academy Award", "Turing Award", "Nobel Prize", etc. might fall within an "awards" category. A seed list is obtained in any of a variety of different ways (e.g., created manually or obtained through automatically processing data) and need not necessarily be completely noise-free.

In accordance with step 204, queries in one or more query logs are analyzed and context terms are identified. Context terms are illustratively words that co-occur with words in the seed list. For example, for the awards category, context terms might be "winners," "Nomination," "nominee," etc. In one embodiment, context terms are additionally or alternatively identified based on positional characteristics.

In accordance with step 206, the context terms are utilized as a basis for identifying new words in the same category. In one embodiment, this means identifying the new words from queries in one or more query logs. For example, continuing the awards category example, this process step might be utilized to add terms such as "Golden Globe" and "American Idol" to the list of terms in the awards category.

It should be noted that the present invention is not limited to using the context terms as a basis for identifying new words in the same category. In one embodiment, as is indicated by block 207, context terms are utilized as a basis for identifying context terms that should be removed from a semantic category because they are, for example, extraneous or obsolete. This is another example of a purpose for which the context terms are utilized.

As is generally indicated by block 205, illustratively an optional step, a metric is applied to compute the importance of context words. Thus, subsequent use of context terms (e.g., as a basis for identifying others terms to add to the relevant category or as a basis for removing extraneous or obsolete terms from a semantic category) can be objectively limited to use of context terms demonstrating a certain level of significance.

Figure 3:
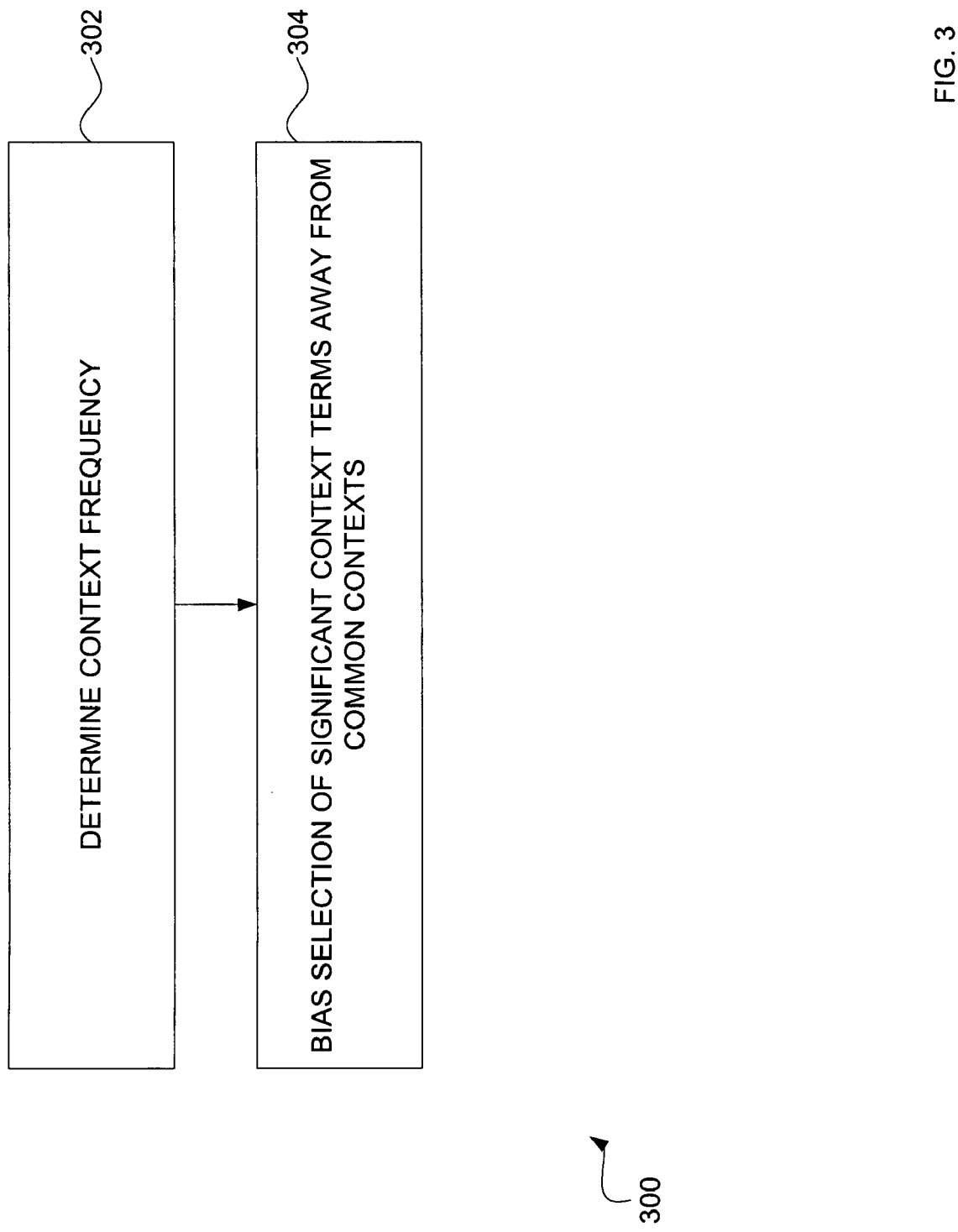
FIG. 3 is a flow chart diagram demonstrating steps associated with a method for separating significant context terms from insignificant context terms.

The scope of the present invention is not limited to any one particular metric for determining the significance of context words. Those skilled in the art will recognize that there are many ways to support such a determination. FIG. 3 is a flow chart diagram demonstrating steps associated with one broad embodiment of a method 300 for separating significant context terms from insignificant context terms.

In accordance with step 302, context frequency is first determined. In one embodiment, context frequency is determined by counting the number of times a context (e.g., a particular term or group of terms) occurs within the query log(s) in association with a term in the seed list for a given category. Following is an example of a table showing an example determination of context frequency within an award category with "academy awards" as a seed term:

| | |
|---|---|
| 202 | academy+awards the+# |
| 86** | academy+awards #+winners |
| 76** | academy+awards #+history |
| 74** | academy+awards #+nominations |

The "#" symbol indicates where the seed terms appear in a query. Thus, the example shows that "the academy awards" appears 202 times in the query log(s), "academy awards winners" appears 86 times, and so on. The pattern in the rightmost column is illustratively referred to as a "context" of the category.

The most frequent contexts for each category can be very general in nature and very well may appear very often regardless of category. For example, the contexts "the+#" and "#+pictures" and "#+history" may be very common across categories. Thus, in accordance with block 304, the selection of significant context terms is biased away from such common contexts. In one embodiment, this is done by penalizing high frequency contexts so as to create a bias toward contexts likely to be good discriminators for a particular category.

Those skilled in the art will appreciate that there are many ways to implement a bias as described. Without departing from the scope of the present invention, any method of co-occurrence normalization can be employed, including, but by no means limited to, TFIDF, mutual information and chi-square tests.

In another embodiment; however, an alternate formula is applied based on the type of frequency of a context normalized by the total frequency of that context in the entire data set. In one embodiment, the normalization factor is also standardized by the same factor on the category, which may be estimated based on a top x (e.g., 1000) most frequent terms. Utilizing this type of scoring function, a list of most typical contexts can be generated. The formula illustratively looks something like:

$$\text{Score (c)} = f\_type\{c\} * \log(g(c)/C)$$
$$g(c) = f\_type\{c\}/F\_inst\{c\}$$
$$C = F\_type\{ctop1000\}/F\_inst\{ctop1000\}$$

F_type: Frequency of context c in the category
F_inst: Frequency of context c in the entire data
ctop100: 100most frequent contexts Continuing the award category example, the highest scoring contexts might include:

```
#+winners
#+nominees
#+nominations
#+winner
#+award
who+won+#
winners+of+#
list+of+#+winners
winners+of+the+#
```

Those skilled in the art will appreciate that there are also many ways in which contexts can be leveraged during a process of selecting new terms to be added to a category list. The present invention is not limited to any one particular method. Neither is the scope of the present invention limited to selecting such terms from the query log(s) themselves. In general, terms that appear with typical contexts (especially with context terms determined to be significant) but which are not already category members might be good additions. Similarly, words in the category not appearing with significant context enough are considered to be good candidates for removal from the category. In one embodiment, new candidates can be selected by applying any of many different potential rules to which the scope of the present invention is not limited to a particular one. In one embodiment, the x (e.g., 20) highest-scoring contexts can be obtained and then new candidates can be ranked by the number of distinct contexts with which they co-occur. This is but one example. An example of new words illustratively identified for categories award and bird are as follows:

AWARD: golden globes, grammys, golden globe, kentucky derby, daytime emmy, sag, sag awards, American idol, daytime, emmys BIRD: cardinal, eagle, penguin, hawk Thus, process 200 utilizes one or more query logs, which are generally available in large quantities, to harvest new terms and classify them into categories and/or to assist in identifying terms that should be removed from a category. There are several advantages to using query logs rather than regular collections of text such as knowledge resources created by human labor (e.g., Wikipedia or Open Mind) or unanalyzed web data. Queries are commonly expressed in the form of a sequence of keywords with little syntactic structure. Thus, queries tend to be relatively succinct and generally contain less noise than regular text (i.e., query logs contain fewer irrelevant words surrounding terms of interest). Context words tend to be easier to identify in query logs than in regular text.

Further, queries tend to directly reflect people's search interests. Query logs, especially Internet search query logs, can be a good reflection of what the general public is interested in at a particular point in time. In comparison, regular text tends to be less dynamic in terms of promoting relevancy.

In one embodiment, the category associated with a seed list is a broad category such as, but not limited to "people," "location," or "organization." It is also possible to subdivide these categories into smaller sub-categories by applying clustering techniques. Other examples of categories include, but certainly are not limited to, geographic regions, product names, product types (e.g., food, clothing, car, etc.), event names, natural objects and colors. The examples of categories herein are just a few of many, many potential examples.

However, the scope of the present invention is not limited to broad categories. In one embodiment, a custom category is created simply providing a corresponding set of seed words. The set may even be small. By performing process 200, the set can be expanded. The process can then be repeated as desired to support further expansion. Because query logs naturally cover a broad range of topics, there is inherent support for a broad range of categories.

Figure 4:
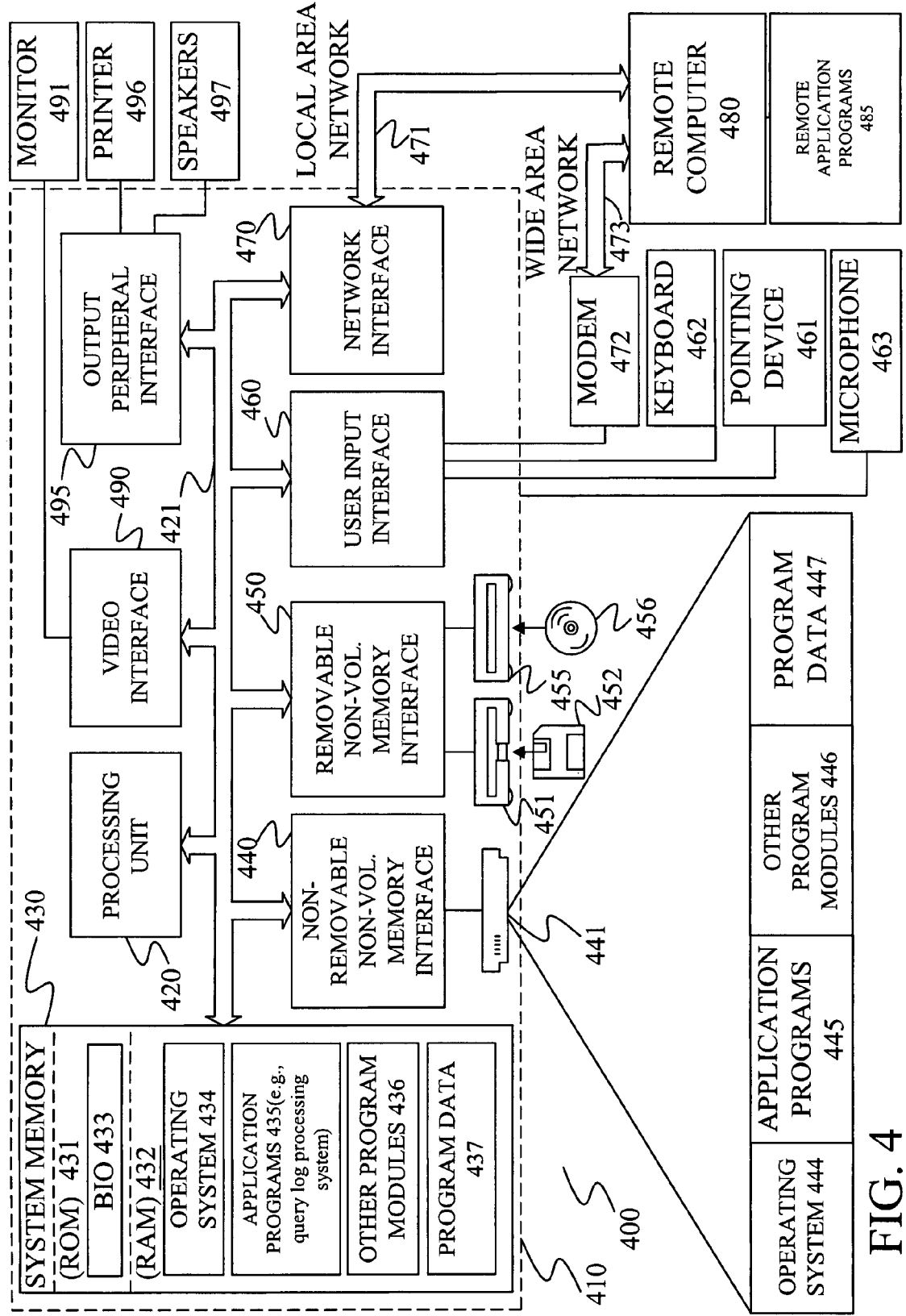
FIG. 4 is an example of a computing system environment.

FIG. 4 illustrates an example of a suitable computing system environment 400 in which embodiments described herein may be implemented. The computing system environment 400 is only one example of a suitable computing environment and is not intended to suggest any limitation as to scope of use or functionality. Neither should the computing environment 100 be interpreted as having any dependency or requirement relating to any one or combination of components illustrated in the exemplary operating environment 400.

The embodiments are operational with numerous other general purpose or special purpose computing system environments or configurations. Examples of well known computing systems, environments, and/or configurations that may be suitable for use with embodiments disclosed herein include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The embodiments may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and figures provided herein as processor executable instructions, which can be written on any form of a computer readable medium.

The embodiments may also be practiced in distributed computing environments where tasks are performed by remote processing devices that are linked through a communications network. In a distributed computing environment, program modules may be located in both local and remote computer storage media including memory storage devices.

With reference to FIG. 4, an exemplary system for implementing the embodiments includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437. Programs 435 are shown as possibly including a query log processing system, such as a system for acquiring ontological knowledge from query logs, embodiments of which are described herein in detail. This is but one example of where in environment 400 such a system might be implemented. Other implementations (e.g., as part of programs 445 or 485) should also be considered within the scope of the present invention.

The computer 410 may also include other removable/non-removable volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 490.

The computer 410 may operate in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of using a computer to modify a list of terms assigned to a semantic category, the method comprising:
   receiving an indication of a seed term;
   using a computer to identify from a log of queries, a query having a set of query terms that includes at least one instance of the seed term in combination with a context word;
   utilizing the computer to automatically identify, from the log of queries, a second query having a set of query terms that does not include the seed term but does include the context word in combination with a different term, the different term being different than the seed term and the context term; and
   utilizing the computer to remove the different term from the list of terms assigned to the semantic category, the different term being removed based on a determination that a significant enough context does not exist between the different term and the seed term, the significance of the context being determined utilizing the formula, $Score(c) = F\_type\{c\} * \log(g(c)/C)$, where $g(c) = F\_type\{c\}/F\_inst\{c\}$,
   where $C = F\_type\{ctopx\}/F\_inst\{ctopx\}$,
   where F_type is a frequency of context c in the semantic category,
   where F_inst is a frequency of context in an entire data, and
   where ctopx is x number of the most frequent contexts.

2. The method of claim 1, wherein receiving the indication of the seed term comprises receiving a user-initiated input.

3. The method of claim 1, wherein a bias is implemented utilizing a mutual information test.

4. The method of claim 1, wherein identifying a query comprises identifying a plurality of queries in the log of queries.

5. The method of claim 1, wherein the log of queries is a log that tracks queries from multiple predefined users.

6. The method of claim 1, wherein the log of queries is a combination of multiple collections of query log information.

7. The method of claim 6, wherein said combination is the combination of multiple collections of query log information obtained from multiple search processors.

8. The method of claim 1, wherein the semantic category is indicative of a person.

9. The method of claim 1, wherein the log of queries is a log of queries from a single predefined user.

10. The method of claim 1, wherein the semantic category is indicative of a location.

11. The method of claim 1, wherein the log of queries is a log of remotely initiated queries.

12. The method of claim 1, wherein the semantic category is indicative of a physical object.

13. The method of claim 1, wherein the log of queries is a log of locally initiated queries.

14. The method of claim 1, wherein the semantic category is customizable.

15. The method of claim 1, wherein the semantic category is subdivided into subcategories.

16. The method of claim 1, wherein the semantic category is subdivided through application of a clustering function.

* * * * *